United States Patent [19]
Valdettaro

[11] 3,938,046
[45] Feb. 10, 1976

[54] NETWORK FOR ISOLATING ANTENNA FROM TUNER

[75] Inventor: Alarico A. Valdettaro, Bloomington, Ind.

[73] Assignee: Sarkes Tarzian, Inc., Bloomington, Ind.

[22] Filed: Oct. 21, 1974

[21] Appl. No.: 516,185

[52] U.S. Cl. ............... 325/362; 317/61; 333/24 C; 343/865
[51] Int. Cl.² ........................................ H04B 1/18
[58] Field of Search ...... 325/357, 362, 380; 333/12, 333/24 C; 317/16, 61, 61.5; 328/8; 343/850, 865

[56] References Cited
UNITED STATES PATENTS

| | | | |
|---|---|---|---|
| 2,777,094 | 1/1957 | Weisberg | 317/61 |
| 3,143,706 | 8/1964 | Michael | 325/362 |
| 3,320,462 | 5/1967 | Kawiecki | 317/61.5 X |

*Primary Examiner*—Paul L. Gensler
*Attorney, Agent, or Firm*—Mason, Kolehmainen, Rathburn & Wyss

[57] ABSTRACT

An isolation network for isolating a pair of balanced antenna terminals from a tuner located in a receiver of the type having a line connected chassis includes an isolating capacitor connected in series with each one of the antenna terminals. A high value bleeding resistor is connected in a direct current conductive circuit across one of the isolating capacitors for discharging the static charge accumulated on the isolating capacitor. A second lower value resistor is connected between the high value resistor and the other isolating capacitor for discharging the other isolating capacitor through the high value resistor.

18 Claims, 5 Drawing Figures

NETWORK FOR ISOLATING ANTENNA FROM TUNER

BACKGROUND OF THE INVENTION

This invention relates generally to isolation networks, and more particularly to networks for isolating a balanced antenna system from a line connected chassis.

Modern radio and television receivers often have chassis that are connected directly to one side of the AC power line. Such receivers generally employ a polarized power plug to assure that the chassis is connected to the grounded side of the power line. However, if an unpolarized plug, an extension cord or an adapter plug is used, the power plug may be reversed. Under such conditions, the chassis will be maintained at a potential equal to the potential of the AC power line.

The radio frequency input circuits of modern receivers generally employ at least one input inductor. Such input inductors are generally grounded to the chassis to reduce radio frequency interference and the possibility of oscillation. When such an input inductor is attached to an antenna terminal, and the AC power plug is reversed, the antenna terminal will have the full AC power line potential applied to it, thereby resulting in a significant shock hazard to the operator of the receiver.

A known technique for isolating an antenna terminal from a line connected chassis utilizes a capacitor connected in a series circuit between the receiver input inductor and the antenna terminal. The value of the capacitor is chosen such that the capacitor provides a relatively low impedance to radio frequency signals and a relatively high impedance to the sixty cycle power line frequency, thereby effectively isolating the antenna terminal from the line connected chassis. Because a static charge of sufficient magnitude to break down the isolating capacitor can build up on the capacitor during an electrical storm or as a result of an electrically charged cloud, a bleeding resistor is generally connected in parallel with the isolating capacitor to discharge any built up static charge. The value of the bleeding resistor is chose to be low enough to effectively discharge the capacitor, and high enough to limit the flow of AC line current between the chassis and the antenna terminal to a safe value. A resistor having a resistance of approximately 5 megohms has been found satisfactory for such purposes. If the resistance is increased significantly above 5 megohms, the capacitor may not be properly discharged, whereas if the value of the resistor is reduced substantially below 5 megohms, not enough isolation is provided to avoid the possibility of a shock hazard.

When a single antenna input terminal is used, adequate isolation can be provided by utilizing a capacitor and a resistor having a resistance in the range of 3 to 5 megohms. When a balanced antenna system having two input terminals is utilized, each terminal must be isolated by means of a separate isolating capacitor and resistor connected in series with each input terminal. The results in two separate paths between the antenna terminals and the chassis. As a result, if both antenna terminals, or both arms of a dipole antenna are simultaneously grasped, the effective resistance between the antenna or terminals and the chassis is equal to the parallel combination of the two isolating resistors. Because neither of the resistors can be reduced to a value of less than approximately 5 megohms and still prevent excessive static charge buildup, the effective resistance between the two antenna terminals and the chassis will be approximately 2.5 megohms. The results in marginal isolation for safety purposes between the antenna terminals and the line connected chassis.

SUMMARY OF THE INVENTION

Accordingly, it is an object of the present invention to provide an improved isolation network for a balanced antenna system.

It is another object of the present invention to provide a resistance capacitance isolation network for an antenna system that provides greater discharge capability of the isolating capacitors and greater isolation between the antenna and chassis than prior art isolation systems.

In accordance with a preferred embodiment of the invention, an isolation capacitor is connected in series with each input lead of the balanced antenna system. A high value bleeding resistor having a resistance on the order of the 3–5 megohms is connected in a direct current conductive circuit across one of the capacitors for discharging any accumulated static charge. A second resistor having a much lower value, on the order of 22 kilohms, is connected between the high value bleeding resistor and the second capacitor. The first capacitor is discharged by the high value bleeding resistor, and the second capacitor is discharged by the series combination of the second resistor and the high value bleeding resistor. Because a single high value bleeding resistor is used to complete the discharge path for both capacitors, there is only one direct current conductive path between the chassis and the antenna terminals. As a result, the increased shock hazard resulting from the use of two separate chassis connected bleeding resistors, as in the prior art, is eliminated. The use of a single bleeding resistor in the system according to the invention, allows the resistance of the bleeding resistor to be reduced to a value below 5 megohms to provide an improved discharge path for the isolating capacitors without creating a shock hazard.

The invention, and its method of operation, together with further objects and advantages thereof, will best be understood by reference to the following specification taken in connection with the accompanying drawing in which:

FIG. 3 is a partial schematic and block diagram of a tuner employing an alternate embodiment of the antenna isolation network according to the invention;

DETAILED DESCRIPTION

Figure 1:
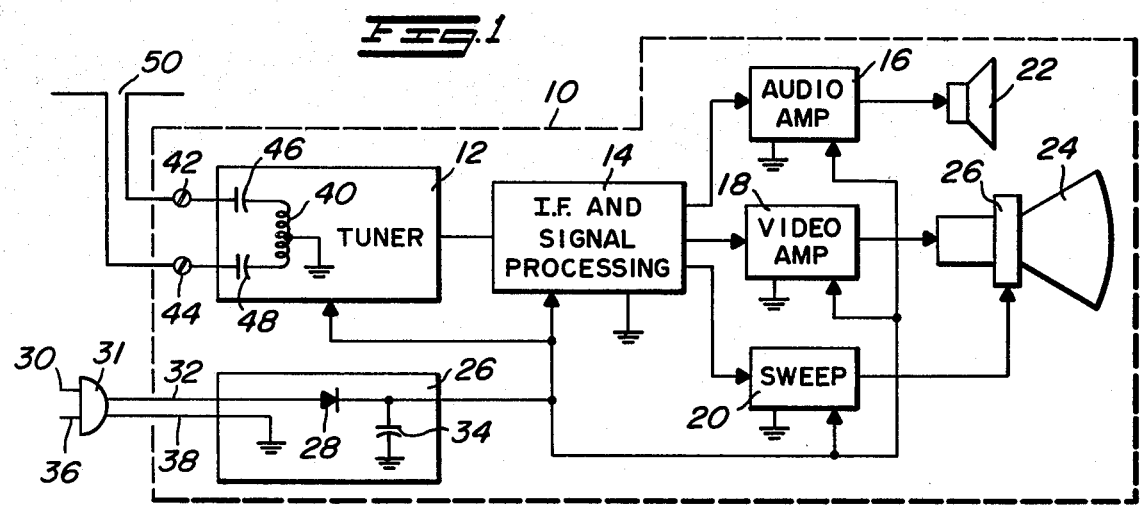
FIG. 1 is a block diagram of a television receiver of the type having one side of the power line connected to the chassis and employing a balanced antenna system.

Turning now to the drawing, with particular reference to FIG. 1, there is shown a television receiver 10 having a tuner 12, IF and signal processing circuitry 14, an audio amplifier 16, a video amplifier 18 and a sweep circuit 20. The audio amplifier 16 drives a loud speaker 22, the video amplifier 18 drives a picture tube 24 and the sweep circuit 20 drives a deflection yoke 26.

The components described above are conventional television components, well known in the art. The above television components are illustrated to provide an environment for the antenna isolation system according to the invention, but it is not intended to restrict the application of the isolation system according to the invention to the configuration shown, the isolation system being applicable to any balanced antenna system wherein it is desired to isolate the antenna from the chassis.

The circuitry of the television receiver 10 is powered by a power supply 26. The power supply 26 illustrated in FIG. 1 utilizes a half wave rectifier 28 having an anode connected to one prong 30 of a power plug 31 by means of a line 32. The cathode of the rectifier 28 is connected to a filter capacitor 34 and to the various stages of the television receiver for applying power thereto. The other prong 36 of the power plug 31 is connected directly to the chassis of the receiver 10 by means of a line 38.

Television receiver tuners such as the tuner 12, generally employ a balanced antenna input system. Typically, such a system utilizes an antenna coil 40 connected to the chassis. The antenna coil 40 typically receives signals from a pair of antenna terminals 42 and 44 coupled to the coil 40 by a pair of isolation capacitors 46 and 48. The values of the capacitance of the isolation capacitors 46 and 48 are chosen such that radio frequency signals are passed from the antenna terminals to the antenna coil 40, but direct current and low frequency signals such as power line frequency signals are attenuated. Typical values for such capacitors lie in the range of approximately 130 pf for VHF television tuners.

The antenna terminals 40 and 42 are connected to an antenna 50 which may be either an indoor or an outdoor antenna. When the antenna 50 is electrically charged during a thunderstorm or as the result of a charged cloud passing overhead, the charge is transferred to the capacitors 46 and 48. If no means are provided for discharging the capacitors 46 and 48, as in the case of the circuit shown in FIG. 1, the charge built up on the capacitors 46 and 48 can result in a voltage across the capacitors 46 and 48 of a sufficient magnitude to break down the capacitors. When such a breakdown occurs, the terminals 42 and 44 are no longer isolated from the chassis of the receiver 10.

Accordingly, a direct current conductive path must be provided across the terminals of the isolation capacitors 46 and 48 in order to discharge the capacitors sufficiently to prevent the buildup of destructive voltages. Experimentation has indicated that in order to properly discharge the isolation capacitors 46 and 48, the resistance of the discharging path cannot exceed approximately 5 megohms. It has also been found that a 5 megohm path between a live chassis and an antenna terminal does not cause a shock hazard nor any objectionable "tingle" when an antenna terminal is touched. Accordingly, in prior art systems, a 5 megohm resistor was simply placed in parallel with the antenna isolation capacitor for discharging the isolation capacitor.

Unfortunately, when a balanced antenna system is employed, and a separate 5 megohm resistor is placed in parallel with each of the isolation capacitors, grasping both of the terminals effectively puts the two 5 megohm resistors in parallel, thereby resulting in a 2.5 megohm path between the antenna terminals and the chassis. Such a 2.5 megohm path provides only marginal isolation, and the normally occurring resistor tolerances (e.g., 20%) can result in a resistive path of approximately 2 megohms between the chassis and the antenna terminals. Such a low resistance results in a tingle when the antenna terminals are grasped and does not provide adequate shock hazard protection.

Figure 2:
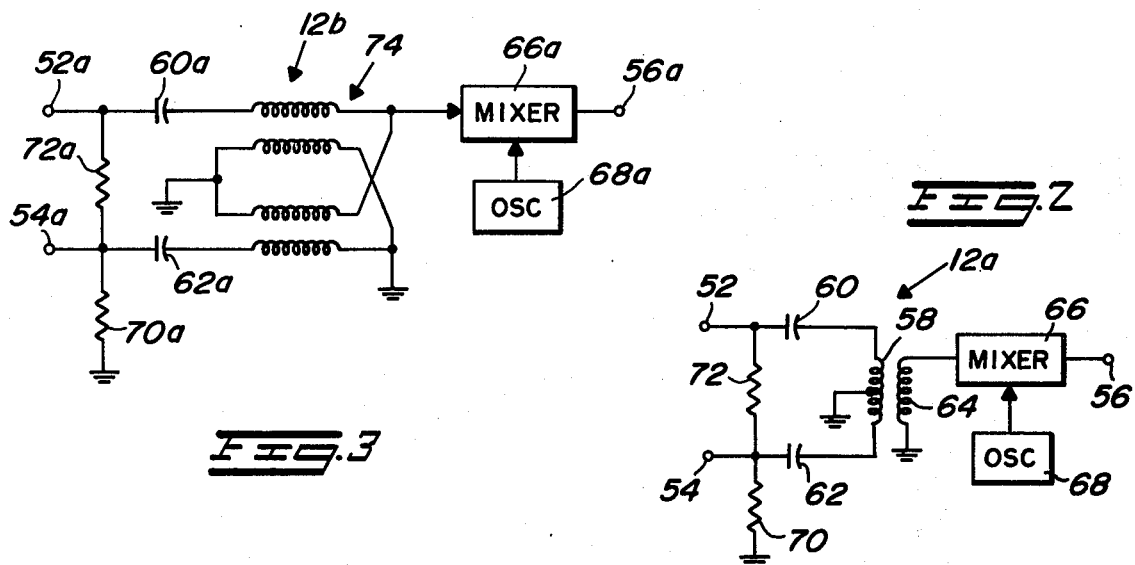
FIG. 2 is a partial block and schematic diagram of a tuner usable in the circuit of FIG. 1 employing the antenna isolation system according to the invention.

The isolation network according to the invention avoids the above problems by discharging both capacitors through a common resistor. Referring to FIG. 2, a tuner 12a similar to the tuner 12 of FIG. 1 has a pair of input terminals 52 and 54 connectable to the antenna terminals 42 and 44 of the circuit of FIG. 1 and an output terminal 56 connectable to the IF and signal processing circuit 14. The terminals 52 and 54 are coupled to an antenna coil 58, analagous to the antenna coil 40, by a pair of isolation capacitors 60 and 62 analagous to the capacitors 46 and 48, respectively. The antenna coil 58 is inductively coupled to a coil 64 which applies the received signal to a mixer 66. A local oscillator 68 applies a local oscillator signal to the mixer 66 to convert the frequency of the signal received from the coil 64 to a frequency compatible with the frequency response of the IF and signal processing circuit 14. The converted signal is then applied to the output terminal 56.

A bleeding resistor 70 is connected between chassis ground and one plate of the capacitor 62. A center tap of the antenna coil 58 is also connected to chassis ground, thereby providing a direct current conductive circuit comprising the resistor 70 and one-half of the coil 58 between the plates of the capacitor 62. If the value of the resistor 70 is kept below 5 megohms, a suitable discharging path for the capacitor 62 is provided.

The capacitor 60 is discharged by means of a bleeding resistor 72 connected between the terminals 52 and 54. The resistor 72 completes a discharge path comprising one-half of the antenna coil 58 and the resistor 70 across the terminals of the capacitor 60. The value of the resistor 72 must be high compared to the radio frequency impedance between the terminals 52 and 54, but should be low compared to the value of the resistor 70 so as not to increase the resistance of the series combination of the resistors 70 and 72 substantially over the resistance of the resistor 70 alone. The resistors 70 and 72 may be physically located within the tuner as shown, or they may be located externally, at a location such as the antenna terminals 42 and 44.

Because the radio frequency impedance between the antenna terminals of a television receiver is generally on the order of 300 ohms, the value of the resistor 72 may be reduced to a value on the order of several thousand ohms. A value of several thousand ohms across a pair of 300 ohm antenna terminals does not significantly attenuate the received signal nor does it affect the discharge path when placed in series with the resistor 70 having a value on the order of several megohms.

Because all direct current and low frequency current flowing between the antenna terminals and the chassis must flow through the resistor 70, there is no paralleling of current paths when a balanced configuration antenna input is used. As a result, the value of the resistor 70 may be reduced below the level of the 5 megohm bleeding resistors typically used. A good value for the resistance of the resistor 70 has been found to be approximately 3.3 megohms, such as value being low enough to discharge both of the capacitors 60 and 62 without causing a shock hazard. A value of 22K ohms for the resistance of the resistor 72 provides only minimal attenuation of the received signal without significantly increasing the combined series resistance of the resistors 70 and 72.

FIG. 3 shows the isolation network according to the invention used with a tuner 12b having a balun 74 in place of the inductively coupled coils 58 and 64 for coupling signals to the mixer. The balun 74 is a conventional balun well known in the art and may be fabricated from coils or from transmission line sections. The components, other than the balun 74, of the tuner 12b are similar to the components of the tuner in 12a, and analagous components in the two tuners are designated by similar reference numerals with the reference numerals in the tuner 12b being followed by the suffix "a".

In the embodiment shown in FIG. 3, the resistors 70a and 72a discharge the isolation capacitors 60a and 62a through tha balun 74. The values of the resistors 70a and 72a are similar to the values of the respective resistors 70 and 72 of FIG. 2 discussed above.

Figure 4:
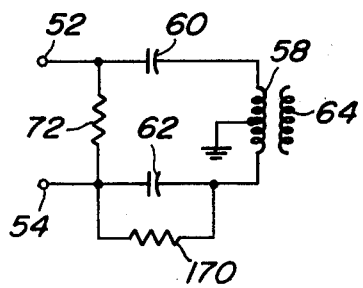
FIG. 4 is a schematic diagram of an alternate form of the antenna isolation network used in the tuner of FIG. 2.
Figure 5:
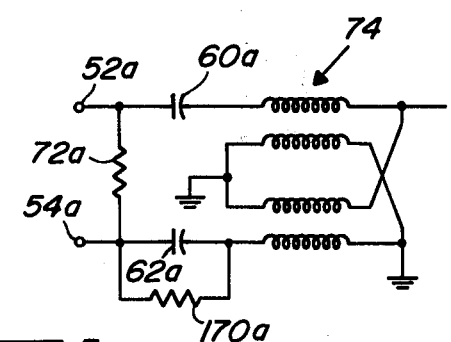
FIG. 5 is a schematic diagram of an alternate form of the antenna isolation network used in the tuner of FIG. 3.

The resistor 70 need not be connected directly between one of the antenna input terminals and the chassis ground as shown in FIG. 2. In an alternative embodiment, the bleeding resistor may be connected across one of the isolation capacitors, for example, the capacitor 62. Such a bleeding resistor 170 is illustrated in FIG. 4. The resistor 170 is connected directly across the terminals of the capacitor 62 for discharging the capacitor. The discharge path for the capacitor 60 includes the resistor 170, the resistor 72 and the coil 58. Similarly, a resistor 170a may be connected across the capacitor 62a (FIG. 5) in place of the resistor 70a shown in FIG. 3. The values of the resistors 170 and 170a are similar to the values of the resistors 70 and 70a, respectively. Components having the same reference numerals in FIGS. 2 and 4 and in FIGS. 3 and 5 are the same components.

Although the present invention has been described in conjunction with the embodiments illustrated in the accompanying drawing, it should be understood that modifications to the illustrated embodiments by one having skill in the art can be effected within the scope and spirit of the invention as defined in the appended claims.

What is claimed as new and desired to be secured by Letters Patent of the United States is:

1. An isolation network for isolating a first pair of terminals from a second pair of terminals for preventing the flow of power line frequency signals between said first and second pairs of terminals while permitting the transfer of radio frequency signals between said first and second terminals comprising:
    first isolating means connecting a first one of said first pair of terminals to a first one of said second pair of terminals, said first isolating means being operative to pass radio frequency alternating current signals therethrough and substantially to block the passage of power line frequency alternating current signals;
    second isolating means connecting a second one of said first pair of terminals to a second one of said second pair of terminals, said second isolating means being operative to pass said radio frequency alternating current signals therethrough and substantially to block the passage of said power line frequency alternating current signals;
    direct current conductive means connected between the first terminals of each of said first and second terminal pairs for providing a direct current conductive path therebetween for discharging said first isolating means; and
    second direct current conductive means connected between the first and second terminals of said first pair of terminals to provide a direct current conductive path therebetween for discharging said second isolating means through said second direct current conductive means and at least a portion of said first direct current conductive means.

2. An isolation network as recited in claim 1 wherein each of said first and second isolating means includes a capacitor.

3. An isolation network as recited in claim 2 wherein said first direct current conductive means includes a first resistor and said second direct current conductive means includes a second resistor.

4. An isolation network as recited in claim 3 wherein the resistance of said first resistor is higher than the resistance of said second resistor.

5. An isolation network as recited in claim 4 wherein the resistance of said first resistor is on the order of approximately 3–5 megohms and the resistance of said second resistor is at least one order of magnitude lower than the resistance of said first resistor.

6. An isolation network for isolating a pair of antenna terminals from a pair of tuner terminals which are direct current coupled to a chassis which is connectable to one side of an electric power line, comprising:
    first and second capacitors, each having a pair of terminals, said first capacitor being connected in a series circuit with one of said antenna terminals and one of said tuner terminals and said second capacitor being connected in a series circuit between the other one of said antenna terminals and the other one of said tuner terminals;
    a first resistor connected in a direct current conductive circuit connected across the terminals of said first capacitor for discharging said first capacitor; and
    a second resistor connected between said antenna terminals, said first and second resistors being connected in a direct current conductive series circuit connected across the terminals of said second capacitor for discharging said second capacitor through said first and second resistors.

7. An isolation network as recited in claim 6 wherein said first resistor is connected directly between said chassis and one terminal of said first capacitor.

8. An isolation network as recited in claim 7 wherein said second resistor is connected directly between one terminal of said second capacitor and the junction of said first resistor and said first capacitor.

9. An isolation network as recited in claim 8 wherein said second resistor is connected directly across said antenna terminals.

10. An isolation network as recited in claim 8 wherein the resistance of said first resistor is greater than the resistance of said second resistor.

11. An isolation network as recited in claim 8 wherein the resistance of said first resistor is greater than the resistance of said second resistor by an order of magnitude.

12. An isolation network as recited in claim 8 wherein the resistance of said first resistor is on the order of several megohms and the resistance of said second resistor is on the order of several kilohms.

13. An isolation network as recited in claim 8 wherein the resistance of said first resistor is on the order of approximately 3-5 megohms and the resistance of said second resistor is on the order of approximately 22 kilohms.

14. An isolation network as recited in claim 6 wherein said first resistor is connected directly across said first capacitor.

15. An isolation network as recited in claim 14 wherein said second resistor is connected between said first and second capacitors.

16. An isolation network as recited in claim 15 wherein said second resistor is connected directly across said antenna terminals.

17. An isolation network as recited in claim 15 wherein the resistance of said first resistor is approximately an order of magnitude greater than the resistance of said second resistor.

18. An isolation network as recited in claim 15 wherein the resistance of said first resistor is on the order of approximately 3-5 megohms and the resistance of said second resistor is on the order of approximately 22 kilohms.

* * * * *